United States Patent [19]

Bergmann et al.

[11] 4,242,144
[45] Dec. 30, 1980

[54] BITUMINOUS MIXED COMPOSITION AND FILLER FOR SAME CONTAINING NON-HYGROSCOPIC CRYSTAL WATER-CONTAINING SUBSTANCES

[75] Inventors: Klaus Bergmann, Heiligenhaus; Friedrich Schmitz, Wülfrath; Gottfried Kilian, Mettmann; Heinz Reppel, Wülfrath, all of Fed. Rep. of Germany

[73] Assignee: Rheinische Kalksteinwerke GmbH, Wülfrath, Fed. Rep. of Germany

[21] Appl. No.: 28,634

[22] Filed: Apr. 9, 1979

[30] Foreign Application Priority Data

Apr. 8, 1978 [DE] Fed. Rep. of Germany ....... 2815285
Jul. 12, 1978 [DE] Fed. Rep. of Germany ....... 2830612

[51] Int. Cl.$^3$ .................... C08L 95/00; C09D 3/24
[52] U.S. Cl. .................... 106/281 R; 106/109; 106/116; 106/275; 106/283; 106/DIG. 7; 260/28.5 AS
[58] Field of Search .................... 106/116, 281 R, 283

[56] References Cited

U.S. PATENT DOCUMENTS

| | | | |
|---|---|---|---|
| 2,603,573 | 7/1952 | Blott et al. | 106/283 |
| 2,775,530 | 12/1956 | Gagle et al. | 106/283 |
| 3,776,748 | 12/1973 | Richards | 106/283 |
| 3,986,889 | 10/1976 | Muntzer et al. | 106/283 |

FOREIGN PATENT DOCUMENTS 2086620  12/1971  France ................... 106/281

OTHER PUBLICATIONS

Chem. Absts. vol. 78:7365s, Sulfates for Road Building, Cochery.
Chem. Absts. vol. 78:127951b, Use—Hydrated Lime—Bituminous Mixtures—Asphalt Cement, Chachas.

*Primary Examiner*—Edward M. Woodberry
*Attorney, Agent, or Firm*—Allison C. Collard; Thomas M. Galgano

[57] ABSTRACT

Hot processed bituminous mixed composition, particularly for road construction, characterized by containing non-hygroscopic, crystal water-containing substances, that upon heating to the mixing temperature of the mixed bituminous composition will completely or partly release their crystal water. The invention further relates to a filler as component of the mixed composition.

12 Claims, No Drawings

BITUMINOUS MIXED COMPOSITION AND FILLER FOR SAME CONTAINING NON-HYGROSCOPIC CRYSTAL WATER-CONTAINING SUBSTANCES

The invention relates to a hot processed bituminous mixed composition, especially for road construction and to a filler for said composition.

In the present state of the art the prevailing opinion is that the stability of a road surface is increased by the amount of compression exerted for obtaining the desired dense grain positioning in the finished surface. This requires a large expense of energy. If the coating applied to the surface cools down too fast, an undesirably large hollow space remains. Such coatings cannot exhibit the expected long life. Therefore, it has already been proposed to increase the amount of bitumen in order to obtain the desired distribution of mineral grain. In order to ascertain the required binding stability, a harder bitumen has to be used in such cases which necessitates automatically a yet higher energy expense, since such a mixture lends itself less easily to construction purposes.

It is the object of the present invention to provide a filler, particularly for bituminous road construction, which improves when hot-treated the readiness to combine with and to densify a bituminous mineral mixture so that a coating with denser grain positioning can be obtained with normal expense of energy, without the necessity of using a larger amount of harder bitumen and without the risk of its becoming oversaturated.

It has now been found according to the invention that a filler for hot-processed bituminous mixed compositions, particularly for road construction, is especially suitable when it contains non-hygroscopic crystal water-containing substances which upon the heating of the filler to the mixing temperature of the bituminous mixture release their crystal water partly or completely.

It will be seen from the following description and the examples, that these substances make it possible to use the mixed compositions containing the filler according to the invention with particular ease for construction purposes, without the expense of greater energy for densification, and that once completed, the construction exhibits advantageous properties not previously observed. The examples also show that—with otherwise comparable conditions —the hollow space volumes are considerably reduced; furthermore, that the Marshall stability is positively increased, and the moldability improved, both at low and high temperatures, as demonstrated by the depth of impression brought about by an indentation tool. As a consequence, even coatings just laid down and having still temperatures of 80°–100° C., may be used by vehicles without being damaged.

According to the invention it is advantageous when the filler contains substances releasing their water above the temperature at which the bituminous composition is used for construction. It is assumed that the advantages obtained by the invention are caused by released crystal water. Thus the reproducibility of the effect increases to a greater extent when the release of the water is strictly controlled.

Furthermore, it is desirable to adjust the amount of water released to 0.05–1% by weight, preferably 0.1–0.3%, calculated on the filler. These amounts refer to conventional coatings with conventional filler contents. Within these limits, the amounts may vary corresponding to the desired effects. The necessary water content is calculated from the crystal water content of the water-releasing substances and their temperature behavior. For particular uses, it may be advantageous if the filler contains substances releasing water in the temperature range of 80°–160° C. This method has the advantage that uncontrolled losses of water are avoided and furthermore that the properties of the mastic become evened out because water is released gradually over a large temperature range. Among the available fillers, $CaSO_4 \cdot 2H_2O$ has proved to be very successful. Its water splits off at temperatures between about 110° and 180° C. Other substances which can be used are shown in the following table by way of example:

TABLE I

| | |
|---|---|
| Aluminum Sulfate | $Al_2(SO_4)_3 \cdot 18\ H_2O$ |
| Barium chloride | $BaCl_2 \cdot 2\ H_2O$ |
| Calcium trimetaphosphate | $Ca_3(P_3O_9)_2 \cdot 9\ H_2O$ |
| Potassium aluminum sulfate | $K\ Al(SO_4)_2 \cdot 12\ H_2O$ |
| Soda | $Na_2CO_3 \cdot 1\ H_2O$ |
| Sodium acetate | $NaCH_3 \cdot COO \cdot 3\ H_2O$ |
| Copper sulfate | $CuSO_4 \cdot 5\ H_2O$ |
| Magnesium Sulfate | $MgSO_4 \cdot 7\ H_2O$ |
| Goethite (iron oxide) | $FeO(OH)$ |

The water releasing substances should be mixed with the filler in extremely finely ground state. This results in producing water or steam in very fine distribution so that it cannot escape prematurely from the mixed mass.

Most of these substances are capable of reabsorbing the released water during the subsequent cooling of the coating. This is an advantage because the mastic blown up by steam or water, respectively, redensifies due to the condensation of the water, and its absorption, thereby being partly sucked or drawn into the structure. This causes surplus binder to disappear from the surface, so that the coating becomes rougher and its skid-resistance improves.

The properties imparted by the filler of the composition according to the invention can be clearly observed by its practical application.

It was further found that there is no need to add to the bituminous mixture the non-hygroscopic crystal water-containing substances as components of the filler. It was found instead that one obtains practically equal, or at least equally valuable, results when introducing the crystal-water-containing addition agents to the bituminous mixture in another manner.

This can be accomplished, e.g. by first premixing the crystal water-containing substances with other appropriate carrier substances and then introducing them into the bituminous mass. As carriers, one may use such materials which are not fillers as such, but which can definitely be used as filler components e.g. asbestos, kieselguhr, powdered rubber, fly ash, finely dispersed plastics, pre-dried sand, and so on. The pre-mixing of these materials or their use as carrier has the purpose of introducing the crystal water-containing substances into the bituminous composition as evenly as possible and to distribute them therein. As shown, the effect of the crystal water-containing substances is best when they are evenly distributed in the mixture.

However, it is also possible to add the crystal water-containing substances to the bituminous mixture without using carrier substances. However, in that case, the effect of the additive cannot be so advantageous because the admixture of relatively small amounts may cause difficulties.

Preferably, the crystal water-containing substances are added in such an amount to the hot-processed bituminous mixed composition that their amount of water being freed at the temperature of mixing is 0.005 to 0.1% by weight, particularly 0.01 to 0.03% by weight calculated on the finished mixed composition.

In the following, the invention will be more fully described in a number of examples, which are however, given only by way of illustration and not of limitation.

EXAMPLE 1

A mixture of the following composition was prepared in the laboratory:

| Basalt chips | 2–5 mm | 48 parts by weight |
|---|---|---|
| Moraine chips | 2–5 mm | 15 parts by weight |
| Fluvial sand | 0–2 mm | 22 parts by weight |
| Bitumen | B 65 | 6.4 parts by weight |
| | | 6.7 parts by weight |
| | | or 7.0 parts by weight |
| Filler | | 10 parts by weight |

In one case, a filler containing 0.4% extremely finely ground gypsum dihydrate was used. After having prepared a Marshall test body by applying 2×50 tampings, the following test results were found:

TABLE 2

| | MIXED COMPOSITION WITH FILLER | | | | | |
|---|---|---|---|---|---|---|
| | With Gypsum Additive | | | Without Gypsum Additive | | |
| Bitumen content parts by weight | 6.4 | 6.7 | 7.0 | 6.4 | 6.7 | 7.0 |
| Hollow Space | 1.97 | 1.32 | 0.51 | 3.14 | 2.19 | 1.55 |
| Marshall Stability | 1000 | 1050 | 960 | 860 | 840 | 800 |
| Flow Value | 43 | 47 | 54 | 39 | 43 | 46 |
| Indentation Depth | | | | | | |
| at 60° after 60 Min. | 0.12 | 0.16 | 0.26 | 0.17 | 0.22 | 0.23 |
| at 140° after 10 Min. | 0.11 | 0.15 | 0.23 | 0.20 | 0.49 | 1.35 |

EXAMPLE 2

In this test series the method of example 1 was followed, with the difference that ground limestone was used as a filler containing 0.6% finely ground gypsum as an additive. The influence of steam shows also in this test series.

TABLE 3

| Binder B 65 | 6.4 | 6.7 | 7.0 |
|---|---|---|---|
| Hollow Space Volume | 1.99 | 1.14 | 0.37 |
| Stability | 1020 | 1080 | 980 |
| Flow Value | 37 | 46 | 52 |
| Indentation Depth | | | |
| at 60° after 60 Min. | 0.11 | 0.14 | 0.22 |
| at 140° after 10 Min. | 0.08 | 0.13 | 0.20 |

The influence of the additive according to the invention as to improvement in density can be deduced from the values of the remaining hollow space volumes. The hollow space volumes drop with equal densification work by 40–75% depending on the composition of the mixture.

The Marshall consistency increases by 20–25% due to the denser grain positioning. Particularly surprising are the results relating to stability, especially at the test temperature of 140° C. That explains the immediate resistance to traffic of the freshly applied coating even at temperatures of 80° to 100° C. as practically tested.

EXAMPLE 3

This example illustrates the embodiment of the invention, in which no filler is used, but the additive is incorporated into the bituminous mixture by way of a carrier. The method used was similar to that of example 1 or 2, but the carrier used for incorporation of the crystal water-containing substance was Rhine sand. The crystal water-containing substance was $CaSO_4.2H_2O$. The results are comparable to those given in the tables above.

It will be obvious to those skilled in the art that other changes and variations can be made in carrying out the present invention without departing from the spirit and scope thereof, as defined in the appended claims.

What is claimed is:

1. In a hot processed bituminous mixed composition particularly for use in road construction, the improvement comprising:
    said composition containing as additives non-hygroscopic crystal water-containing substances capable of releasing their crystal water partly or completely at the mixing temperature.

2. The bituminous mixed composition according to claim 1, wherein said non-hygroscopic, crystal water-containing substances comprise $CaSO_4.2H_2O$.

3. The bituminous mixed composition according to claim 1, wherein said composition contains said non-hygroscopic crystal water-containing substances in such an amount that the water released at the mixing temperature is between 0.005% and 0.1% by weight calculated on the weight of bituminous composition.

4. In a filler for a hot processed bituminous mixed composition, particularly for road construction, the improvement comprising:
    said filler containing non-hygroscopic, crystal water-containing substances, which upon heating of the filler, as a component of the mixed composition, to the mixing temperature of said mixed bituminous composition will completely or partly release their crystal water.

5. The filler according to claim 4, wherein said crystal water-containing substances release their water above the temperature at which the bituminous mixed composition is used for construction.

6. The filler according to claim 5, wherein the amount of water released is from 0.05 to 1% by weight calculated on the weight of the filler.

7. The filler according to claim 6, wherein the amount of water released is from 0.1 to 0.3% by weight.

8. The filler according to claim 4, wherein the water is released at temperatures between 80° and 160° C.

9. The filler according to claim 4, wherein said non-hygroscopic, crystal water-containing substances comprise $CaSO_4.2H_2O$.

10. The filler according to claim 4, wherein said crystal water-containing substances are capable of reversibly binding the released water.

11. The bituminous mixed composition according to claim 1, wherein said crystal water-containing substances are evenly distributed therein.

12. The filler according to claim 4, wherein said crystal water-containing substances are evenly distributed therein.

* * * * *